May 12, 1953
A. S. PARKS
2,637,947
PILOT REGULATOR
Filed July 6, 1948
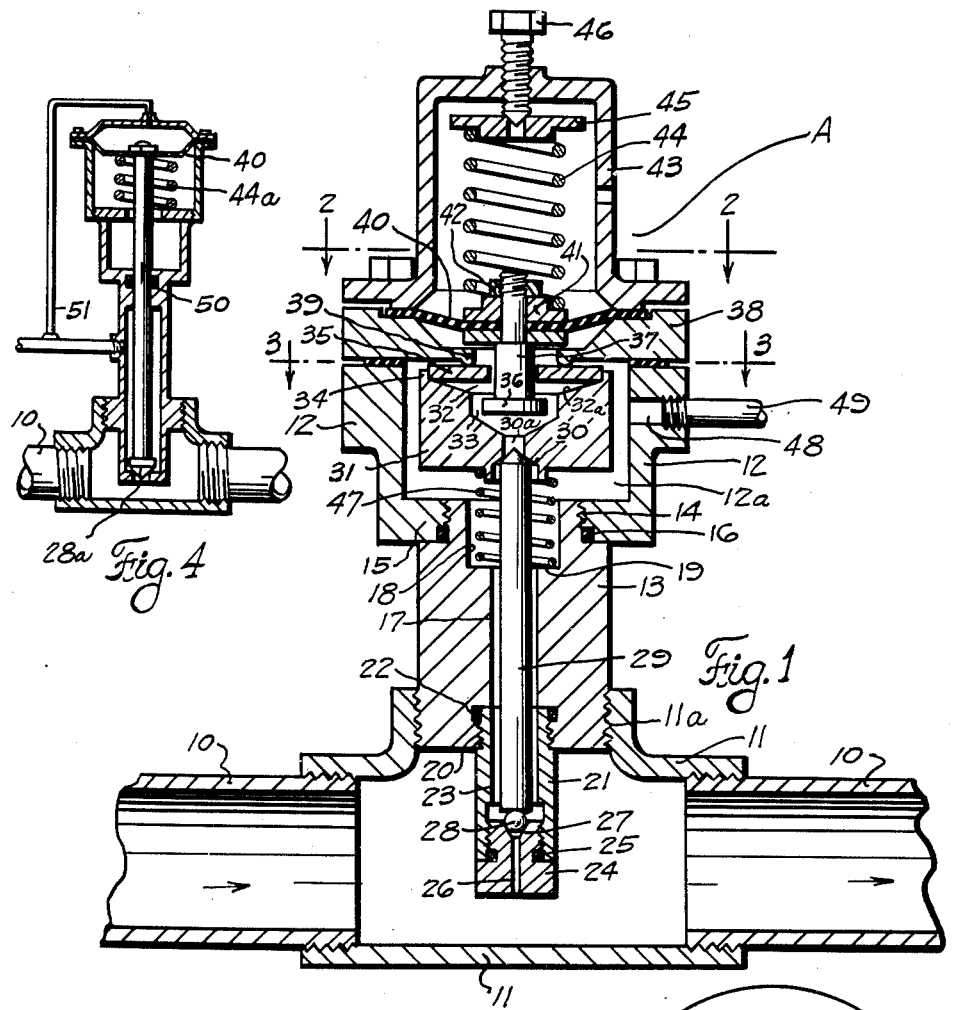
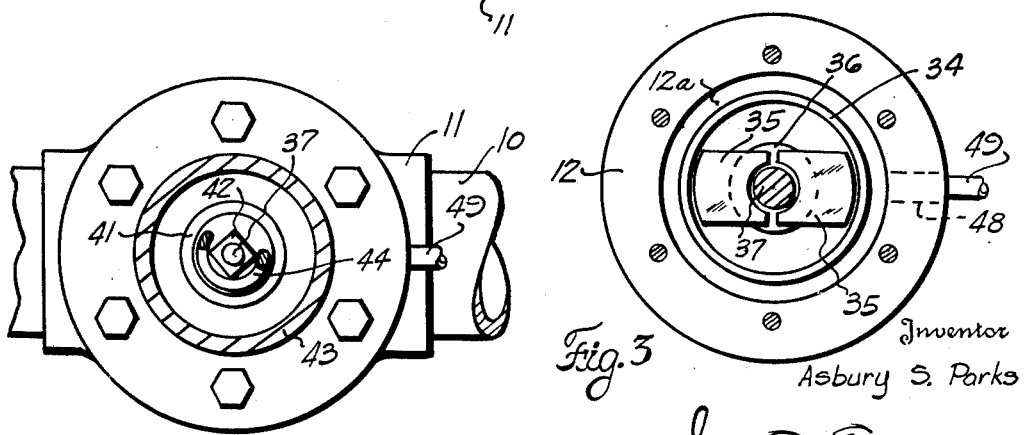
Inventor
Asbury S. Parks
By Joe E. Edwards
Attorney Patented May 12, 1953

2,637,947

UNITED STATES PATENT OFFICE 2,637,947

PILOT REGULATOR

Asbury S. Parks, Houston, Tex.

Application July 6, 1948, Serial No. 37,183

9 Claims. (Cl. 50—26)

This invention relates to new and useful improvements in pilot regulator apparatus.

As is well known, there are many devices used in industry which are actuated or controlled by a pilot pressure fluid and in most instances the pressure of such pilot fluid is relatively low although, of course, it must be regulated and maintained substantially constant. As an example, dump or escape valves on oil and gas separators are controlled by a pilot gas pressure which is ordinarily furnished from the gas produced in the separating equipment; other types of apparatus which are ordinarily pilot pressure controlled or actuated are chemical injector pumps, gas heater firing controls and back pressure and pressure reducing regulator equipment. As above stated, the pilot fluid pressure is relatively low and may be supplied from any desired source although in the majority of cases, and particularly in the petroleum industry, it is convenient and desirable to obtain the pilot fluid from a high pressure fluid line or source. Thus, in a pilot operated dump valve for separators it is convenient to obtain the pilot gas from the high pressure gas which is separated from the other well fluids in the separator. In the operation of a pilot-controlled regulator for regulating flow through a high pressure gas line it is convenient and desirable to obtain the pilot gas from the high pressure line and thus, it may be said that it is common practice to utilize a high pressure source of gas as the source for a pilot fluid. This practice involves reducing the high pressure gas to take relatively low pressure which is required for pilot operated devices, with the result that the problem of freezing due to the excessive reduction is encountered. Various attempts to solve this freezing problem by employing auxiliary heaters or other means have been made but have not been too successful.

It is one object of this invention to provide an improved pilot regulator apparatus for obtaining a pilot pressure fluid of reltaively low pressure from a source of fluid having a relatively high pressure without danger of freezing which is normally caused by the expansion occasioned by the pressure-reduction step.

An important object of the invention is to provide an improved pilot regulator apparatus for conducting a portion of the fluid from a high pressure fluid line and reducing the pressure of said portion for use as a pilot pressure fluid, said apparatus including a pressure reducing valve which is located in the main high pressure line and which is substantially surrounded by the flowing high pressure fluid, whereby the relatively warmer temperature of said high pressure fluid in the line is utilized to defeat freezing at the pressure reduction valve.

Another object of the invention is to provide an improved pilot regulator apparatus having connection through a pressure reducing valve with a main line or conductor through which a high pressure fluid flows, said apparatus also having connection through an outlet with a pilot line, whereby a portion of the fluid from the main line may be conducted therefrom and its pressure reduced through the pressure reducing valve after which it is delivered to the pilot line; said apparatus also including means responsive to the pilot line pressure for controlling actuation of the pressure reducing valve, whereby the pilot line pressure may be accurately regulated and maintained at a desired predetermined point.

A particular object of the invention is to provide an apparatus, of the character described, wherein the pressure reducing valve is located wholly within the flow stream in a high pressure gas line so as to be surrounded by the gas stream and wherein said valve is adapted to conduct a portion of the gas from the high pressure gas line to a pilot line; that portion of the gas passing the valve being of relatively small volume as compared to the total volume of the flow stream, whereby the relatively warmer temperature of the flowing high pressure stream substantially nullifies the cooling which is caused by the pressure reduction of the realtively small volume with the result that the temperature of that portion of the gas which has had its pressure reduced is substantially the same as that of the flowing high pressure stream and freezing at the pressure reducing valve is thereby prevented.

A particular object of the invention is to provide an improved regulator apparatus, of the character described, wherein the actuation of the pressure reducing valve which controls flow of fluid to the pilot line is controlled by a pressure responsive element, such as a diaphragm, which has one side exposed to the pressure in the pilot line and its opposite side acted upon by a manually adjustable resilient means, such as a spring, whereby operation of the valve is in accordance with the adjustment of said resilient means and any desired predetermined pressure may be maintained in the pilot line.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a transverse, vertical, sectional view of a pilot regulator apparatus, constructed in accordance with the invention, Figure 2 is a horizontal, cross-sectional view taken on the line 2—2 of Figure 1, Figure 3 is a horizontal, cross-sectional view, taken on the line 3—3 of Figure 1, and Figure 4 is a sectional view of a modified form of the invention.

In the drawings, the numeral 10 designates a flow conductor or line through which high pressure fluid such as gas flowing from a high pressure well is conducted. A T 11 is connected in the line and is arranged to support the improved pilot regulator device comprising the present invention. A flow through the line may be in either direction and as illustrated is in the direction of the arrow shown in Figure 1.

The regulator device A includes a main body 12 which has its lower end connected through a tubular coupling member 13 with the vertical opening 11a in the T 11. The coupling member 13 is illustrated as threaded into the opening 11a and is provided with an upper reduced end threaded into an axial bore 14 formed in the bottom 15 of the body 12, with a suitable packing ring 16 sealing between the coupling and body; however, it is pointed out that the coupling could, if desired, be made integral with the body 12.

The coupling element or shank 13 which depends from the body 12 is provided with an axial bore 17 which has its upper end enlarged at 18 to form an internal annular shoulder 19. The lower end of the bore 17 is enlarged and screw threaded as indicated at 20, whereby a pressure reducing valve housing 21 may be threaded thereinto. A suitable annular packing ring 22 packs off the joint between the valve housing and the bore of the coupling. The valve housing 21 is formed with an axial bore 23 having substantially the same diameter as the bore 17 of the coupling and the lower portion of the bore 23 is enlarged and internally threaded to receive a valve seat member 24. A suitable packing ring 25 seals the joint between the valve seat member and the valve housing.

The seat member 24 has an axial reduced bore 26 and a beveled valve seat 27 is formed at the upper end of this bore. A ball valve 28 is adapted to engage the seat and as will be explained, is arranged to be urged onto said seat by an elongate stem or plunger 29 which extends upwardly through the bore 17 of the coupling member or shank 13 and projects into the interior 12a of the main housing 12.

It is noted that the disposition of the valve housing having the ball 28 and seat 27 therein is such as to locate these parts substantially in the line of flow through the high pressure line which will be presumed to contain high pressure gas such as flows from a petroleum well. The flowing gas, under a relatively high pressure is at a temperature above or at the dew point and the valve is, of course, surrounded by this flowing gas so that it is maintained at substantially the same temperature. When the ball 28 is unseated to permit a flow of gas through the reduced bore 26 and then upwardly around the valve stem 29 through the bore 17, a cooling will take place at the seat 27. It is well known that as gas expands, a cooling effect is produced which under certain conditions would be sufficient to freeze any hydrates in the line to the point of interfering with operation of the valve. By locating the valve directly in the flow line and in an atmosphere of the high pressure flowing gas which is at a temperature above or at the dew point, the cooling caused by the very small volume of gas passing the seat 27 is overcome by the great mass of warmer fluid surrounding the valve housing and its associate parts, with the result that these parts do not ever get appreciably cooler than the gas line temperature. In this manner no condensation can occur and the small stream of low pressure gas flowing through the bore 17 is at substantially line temperature. It is the disposition of the valve 28 and its seat 27 within the flow line which makes it possible to utilize the flow line temperature to prevent freezing at the seat. With this arrangement a small portion of the gas from the line 10 may be taken past the valve 28 and reduced to a relatively low pressure without danger of freezing which would interfere with efficient operation.

In order to control the ball valve 28 so that the desired pilot pressure may be obtained, the upper end of the valve stem 29 engages a beveled seat 30 formed in the lower portion of a movable block 31 which forms part of a reversing mechanism. Above the seat 30 the block is provided with an axial bore 30a which communicates with a cavity 32 provided in the upper surface of the block, such communication being through an enlarged bore portion 33. The bottom of the cavity or recess 32 is inclined as indicated at 32a and the vertical wall of the cavity is defined by an upstanding annular flange 34. The block 31 is mounted within the interior 12a of the housing 12.

A pair of diametrically opposed lever or rocker arms 35 have their outer ends resting within the cavity adjacent the annular flange 34 and the inner ends of said arms overlie and engage an enlarged head 36 which is formed on the lower end of an operating diaphragm stem 37. An annular ring 38 overlies and is secured to the upper end of the housing and is provided with inwardly directed fulcrum or rocker lugs 39 which engage the upper surface of the lever arms 35 intermediate the ends of said arms. The operating stem 37 extends through the central portion of a diaphragm 40 and is suitably secured thereto by washers 41 and a nut 42. The peripheral portion of the diaphragm is clamped to the upper surface of the annular ring 38 by the lower portion of a flanged housing 43. Disposed within the housing 43 is a coil spring 44 which has its lower end engaging the upper washer 41 of the diaphragm assembly while its upper end is engaged by a flanged follower 45. An adjusting screw 46 threaded through the upper end or top of the housing 43 has its lower end contacting the follower 45 and it will be evident that by adjusting the screw a desired spring tension or pressure may be exerted on the upper surface of the diaphragm 40.

By observing Figure 1 it will be seen that the diaphragm 40 closes the upper end of the interior 12a of the housing 12 and the space beneath the diaphragm is in communication with the bore 17 through which pressure fluid flows when the ball valve 28 is unseated. The block 31 is constantly urged upwardly by a light spring 47 which is confined between the underside of the block and the internal shoulder 19 within the bore of the coupling member 13. A radial outlet 48 extends through the wall of the housing 12 and has a pilot line 49 connected therewith.

With the reversing mechanism, the pressure within the interior of the body 12, which is the pressure in the pilot line 49, acts against the underside of the diaphragm and holds said diaphragm upwardly in its raised position with the head 36 of the diaphragm stem 37 exerting an upward pull on the lever arms 35. Due to the fulcrum point of said arms, the outer ends of said arms are urged downwardly to exert a downward force on the block 31 and this downward force is transmitted through the valve stem 39 to the ball 28 to maintain said ball on its seat. Thus, so long as the pilot line pressure is maintained at the desired pressure as controlled by the adjustment spring 44, the ball valve 28 is held on its seat against the greater pressure in the flow line which is acting against the underside of the ball through the reduced passage 26 in the valve member 24.

Whenever the pilot line pressure present in the interior 12a of the housing 12 falls below the desired pressure, the spring 44 moves the diaphragm downwardly whereby the inner ends of the lever arms 35 may move downwardly to permit upward movement of the outer ends of said arms by the block 31. Upward movement of the block relieves the pressure on the valve stem 29, whereby the presure in the gas line may unseat the valve 28 and permit an upward flow through the bore 17 of the coupling member 13 into the interior 12a of the housing 12 and then into the pilot line 49. As the pressure increases within the interior 12a, this pressure acts against the underside of the diaphragm and when said pressure reaches the desired point the diaphragm is moved upwardly against the tension of the spring 44. Upward movement of the diaphragm lifts the inner ends of the lever arms 35 whereby the outer ends thereof impart a downward movement to the block and to the valve stem 29, thereby reclosing the valve.

With this arrangement the pressure in the pilot line may be maintained at a relatively low pressure, as compared to the pressure in the gas line and obviously adjustment of the spring 44 makes it possible to hold the desired or predetermined pressure in said pilot line.

The cooling effect which is caused by expansion of the fluid occurs at the valve seat 27 since it is at this point that the high pressure fluid expands into the larger bore 17. As has been pointed out this valve and its associate parts are disposed within the flow stream of the high pressure gas line 10. The high pressure gas within this line is at a temperature above the dew point and the volume of gas taken off for the pilot line is relatively small. Thus, the pressure reduction takes place in an atmosphere of warmer temperature and the cooling effect caused by the relatively small volume passing the valve 28 is substantially nullified with the result that there is no danger of freezing at this point. The apparatus makes it possible to direct a relatively small volume of the total gas flowing through the main line through the valve to reduce its pressure to the desired pilot line pressure. The weight of gas cooled by expansion is such a small part of the total flowing that the lower temperature given the smaller volume is so near to the temperature of the gas in the line that there is substantially no difference. In effect, the relatively warmer temperature of the high pressure gas is utilized to prevent freezing at the reduction valve 28.

It is pointed out that the particular arrangement shown in the drawings employs the reversing mechanism, whereby the gas within the pilot line and interior of the housing may act upon the underside of the diaphragm. However, the same result could be obtained by eliminating the reversing mechanism and providing a direct connection between the valve 28a and the diaphragm as shown in Figure 4. In this event a pack off 50 around the connecting stem between the valve and diaphragm is provided and the pressure from the pilot line acts on the upper end of the diaphragm through a line 51. A suitable spring 44a is arranged below the diaphragm so that the desired pilot pressure can be maintained. The important feature of the present apparatus is the location of the pressure reducing valve in the main flow line, whereby the disadvantages of freezing are overcome.

The pilot pressure from the line 29 may be used for any desired purpose. For example, it might be employed to control the usual dump valve of a separator unit or for operating a back pressure and pressure reducing regulator. Also pilot pressure is utilized in chemical injector pumps or gas heater firing controls. It is obvious that the present invention may be utilized to provide a pilot pressure fluid at a desired pressure from a main gas line of relatively high pressure for any operating purpose.

It is pointed out that the axial bore 26 which has the valve seat 27 at its upper end is relatively small in cross-sectional area, whereby in the event that the diaphragm ruptures or the pilot line breaks in which case the ball 28 would be unseated, the restricted bore functions as a choke which limits the escape of pressure fluid from the main line until the damage can be repaired. Also the use of the smaller bore is advantageous during actual operation because only a relatively small portion or volume of gas may flow therethrough when the valve 28 is unseated which means only a relatively small portion of gas need be heated. Obviously, because of the physical limitations of the flow line, the size of the valve housing 21 which comprises the available heat transfer area is limited and therefore even though the housing is relatively small it provides sufficient heat transfer area to efficiently cool the relatively small volume of gas which flows through the restricted bore 26.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A pressure regulator apparatus including, a flow conductor for a high pressure gas stream, a body connected with the flow conductor, a reduced pressure line extending from the upper portion of the body, said body having a passage establishing communication between the interior of the high pressure flow conductor and the reduced-pressure line, a valve housing in the lower end of the passage and having its major portion extending downwardly into the flow conductor, a valve seat in said housing, a valve wholly within the housing and having a valve head also within the housing and adapted to engage said seat for controlling flow through the valve housing and through the passage which establishes communication between the flow conductor and the reduced-pressure line, and pressure-responsive means in the upper portion of the body and actuated in accordance with the pressure in the reduced-pressure line for controlling actuation of the valve, whereby a predetermined pressure may be maintained in the reduced-pressure line.

2. A pressure regulator apparatus including, a flow conductor for a high pressure gas stream, a body connected with the flow conductor, a reduced-pressure line extending from the upper portion of the body, said body having a passage establishing communication between the interior of the high pressure flow conductor and the reduced-pressure line, a valve housing connected in the lower end of the passage and extending downwardly into the flow conductor, a valve seat in said housing, a valve wholly within the housing and having a valve head also within the housing and adapted to engage said seat for controlling flow through the valve housing and through the passage which establishes communication between the flow conductor and the reduced-pressure line, a diaphragm element within the upper portion of the body, a spring means acting on one side of the diaphragm and urging the same in one direction, means for exposing the opposite side of the diaphragm to the pressure in the reduced-pressure line, whereby said pressure moves the diaphragm in a direction opposed to the spring means, and means for transmitting the force of the pressure in the reduced-pressure line through the diaphragm and to the valve to urge the valve toward a seated position, whereby so long as the pilot pressure is maintained at a certain predetermined point, the valve remains seated, reduction of the pilot pressure below the predetermined desired pressure allowing the spring means to move the diaphragm in a direction which will allow opening of said pressure reduction valve.

3. A pressure regulator apparatus as set forth in claim 1, wherein the passage which establishes communication between the interior of the high pressure of the flow conductor and the reduced-pressure line has a restriction therein to limit the flow through the passage in the event that the valve becomes inoperative to close flow through the passage.

4. A pressure regulator apparatus including, a source of high pressure fluid, a body having a passage which has one end communicating with the source of high pressure fluid for conducting a portion of said high pressure fluid from said source, a reduced-pressure line extending from the other end of said passage, an internal valve seat adjacent that end of the passage which communicates with the source of high pressure fluid, a pressure reducing valve element including a valve stem disposed within the passage and having a part of lesser diameter than said valve stem and engageable with the valve seat within said passage, whereby the opening through said valve seat is less than the diameter of the valve stem pressure-actuated means operated by the pressure in the reduced pressure line and connected with the elongate valve stem of said pressure reducing valve element to move the valve element toward closed position upon an increase in pressure in the reduced pressure line and to move said valve element toward closed position upon a decrease in pressure in said line to thereby control the pressure of fluid flow from the high pressure fluid source to the reduced-pressure line, said valve seat and valve element part co-acting therewith being so located with respect to the source of high pressure fluid that the point of pressure reduction adjacent the valve seat is substantially surrounded by the high pressure fluid whereby the heat of said fluid prevents freezing at said point of pressure reduction.

5. A pressure regulator as set forth in claim 4, wherein the passage which establishes communication between the high pressure fluid source and the reduced-pressure line has a restriction mounted therein beyond the valve seat to limit the flow through said passage in the event that the pressure reducing valve element fails to close flow through said passage.

6. A pressure regulator apparatus including, a flow conductor for a high pressure fluid, a housing connected with the flow conductor, a reduced-pressure line extending from the housing, said housing having a passage establishing communication between the flow conductor and the reduced pressure line, a pressure reducing valve unit mounted within that end of the passage adjacent the flow conductor for controlling flow through the passage whereby a portion of the high pressure fluid from said flow conductor may be conducted from the conductor and its pressure reduced before passing to the reduced-pressure line, said pressure reducing valve unit including, a tubular valve housing which is mounted in the end of the passage and which extends into the flow conductor, a valve seat member in the end of the valve housing and having an axial opening surrounded at its inner end by an annular valve seat, a valve element engageable with the valve seat and disposed wholly within the valve housing and passage, said element being moved to closed position against the pressure of the high pressure fluid, and means responsive to the pressure in the pressure-reducing line and connected with the valve element for controlling the movement thereof with respect to the seat.

7. A pressure regulator apparatus including, a flow conductor for a high pressure fluid, a housing connected with the flow conductor, a reduced-pressure line extending from the housing, said housing having a passage establishing communication between the flow conductor and the reduced pressure line, a pressure reducing valve unit mounted within that end of the passage adjacent the flow conductor for controlling flow through the passage whereby a portion of the high pressure fluid from said flow conductor may be conducted from the conductor and its pressure reduced before passing to the reduced-pressure line, said pressure reducing valve unit including, a tubular valve housing which is mounted in the end of the passage and which extends into the flow conductor, a valve seat member in the end of the valve housing and having an axial opening surrounded at its inner end by an annular valve seat, a valve element engageable with the seat and having a valve stem extending axially through the passage, and means responsive to the pressure in the pressure reducing line and connected with the valve stem for controlling the movement of the valve element with respect to the valve seat.

8. A pressure regulator apparatus as set forth in claim 7, wherein the axial opening in the valve seat member is of a diameter less than that of the valve stem whereby said opening functions as a control choke in the event said valve element fails to seat.

9. A pressure regulator apparatus including, a flow conductor for a high pressure fluid, a housing connected with the flow conductor, a reduced-pressure line extending from the housing, said housing having a passage establishing communication between the flow conductor and the reduced pressure line, a pressure reducing valve unit mounted within that end of the passage adjacent the flow conductor for controlling flow through the passage whereby a portion of the high pressure fluid from said flow conductor may be conducted from the conductor and its pressure reduced before passing to the reduced-pressure line, said pressure reducing valve unit including, a tubular valve housing which is mounted in the end of the passage and which extends into the flow conductor, a valve seat member in the end of the valve housing and having an axial opening surrounded at its inner end by an annular valve seat, a valve element engageable with the valve seat and disposed wholly within the valve housing and passage, means for moving said element to closed position against the pressure of the high pressure fluid, a pressure responsive element within the housing having its inner side exposed to the pressure in the pressure-reducing line, and a motion-reversing mechanism interposed between the pressure-responsive means and the valve element and connecting these parts, whereby movement of the diaphragm in one direction will cause movement of the valve element in an opposite direction.

ASBURY S. PARKS.

References Cited in the file of this patent

UNITED STATES PATENTS

| Number | Name | Date |
|---|---|---|
| 870,526 | Bossert | Nov. 5, 1907 |
| 1,874,293 | Hook | Aug. 30, 1932 |
| 2,051,484 | Jordan | Aug. 18, 1936 |
| 2,440,608 | Hunter | Apr. 27, 1938 |
| 2,451,586 | Strid | Oct. 19, 1948 |
| 2,520,302 | Barnes | Aug. 29, 1950 |

FOREIGN PATENTS

| Number | Country | Date |
|---|---|---|
| 544,481 | Great Britain | Apr. 15, 1942 |